United States Patent
Lin et al.

(10) Patent No.: US 9,660,685 B1
(45) Date of Patent: May 23, 2017

(54) ELECTRONIC DEVICE AND KEY MODULE

(71) Applicant: HTC Corporation, Taoyuan (TW)

(72) Inventors: I-Hsuan Lin, Taoyuan (TW); Ying-Yen Cheng, Taoyuan (TW); Yu-Jing Liao, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/050,466

(22) Filed: Feb. 23, 2016

(51) Int. Cl.
*H04M 1/00* (2006.01)
*H04B 1/38* (2015.01)
*H04B 1/3888* (2015.01)

(52) U.S. Cl.
CPC .................................. *H04B 1/3888* (2013.01)

(58) Field of Classification Search
CPC .. H04N 1/0202; H04N 1/0214; H04N 1/0241; H04N 1/72519; H04B 1/3827
USPC .... 455/90.2, 90.3, 556.1, 556.2, 557, 575.1, 455/575.4, 575.8; 379/428.01, 433.01, 379/434, 440
See application file for complete search history.

(56) References Cited

U.S. PATENT DOCUMENTS

| | | | | |
|---|---|---|---|---|
| 5,436,954 | A * | 7/1995 | Nishiyama | G06F 3/0236 455/575.3 |
| 7,406,331 | B2 * | 7/2008 | Middleton | H04M 1/0235 455/556.1 |
| 7,428,430 | B2 * | 9/2008 | Ahn | H04M 1/0237 455/575.4 |
| 7,606,043 | B2 * | 10/2009 | Stokholm | H04M 1/0237 455/575.1 |
| 7,792,557 | B2 | 9/2010 | Mizuta et al. | |
| 7,831,286 | B2 * | 11/2010 | Cho | G06F 1/1624 379/433.01 |
| 7,856,255 | B2 * | 12/2010 | Tsuchiya | G06F 1/1616 379/428.01 |
| 7,953,463 | B2 * | 5/2011 | Misawa | G06F 1/1622 455/575.4 |
| 8,295,897 | B2 * | 10/2012 | Griffin | H04M 1/0235 455/575.1 |

(Continued)

FOREIGN PATENT DOCUMENTS

| CN | 101677039 | 3/2010 |
|---|---|---|
| CN | 101853743 | 10/2010 |
| CN | 104796547 | 7/2015 |

OTHER PUBLICATIONS

"Office Action of Taiwan Counterpart Application", issued on Dec. 26, 2016, p. 1-p. 7.

*Primary Examiner* — Quochien B Vuong
(74) *Attorney, Agent, or Firm* — Jianq Chyun IP Office

(57) ABSTRACT

An electronic device and a key module are provided. The electronic device includes a case, a key plate, a switch, a location sensor and a processor. The case has a first hole. The key plate is slidably disposed at the inner wall of the case. Portion of the key plate is exposed at the first hole, and the key plate is configured to slide between a first location and a second location. The switch is disposed at the case. The key plate is suitable for pressing the switch to enable the switch to send a switch signal. The location sensor is disposed at the case for sensing whether the key plate is located at the first location or the second location. The processor is electrically coupled to the switch and the location sensor and performs a first command or a second command in response to the switch signal and according the sensing result of the location sensor.

14 Claims, 3 Drawing Sheets

(56) References Cited

U.S. PATENT DOCUMENTS

2008/0146275 A1* 6/2008 Tofflinger ........... H04M 1/0202
455/556.1
2013/0307790 A1* 11/2013 Konttori ............... G06F 3/0488
345/173

* cited by examiner

ELECTRONIC DEVICE AND KEY MODULE

BACKGROUND OF THE INVENTION

Field of the Invention

The invention relates to an electronic device and a key module, and more particularly relates to an electronic device and a multifunction key module.

Description of Related Art

In recent years, along with the daily development of technology and industry, electronic devices, such as notebook computer, tablet computer, and mobile phone, etc., are widely used in our daily life. The types and functions of electronic devices are becoming more and more diverse, and the convenience and practicality is making these electronic devices more popular. In order to be easier to carry, the user's requirements about lightweight and thin electronic devices is becoming higher and stricter day by day. Therefore, how to make each element of the electronic device perform more functions become a topic that needs to be well researched.

SUMMARY OF THE INVENTION

The invention provides an electronic device and a key module able to solve the problem of the conventional technology that the key is able to perform only one function.

The electronic device of the invention includes a case, a key plate, a switch, a location sensor and a processor. The case has a first hole. The key plate is slidably disposed at the inner wall of the case. A portion of the key plate is exposed at the first hole, and the key plate is configured to slide between a first location and a second location. The switch is disposed at the case. The key plate at the first location or the second location is suitable for pressing the switch to enable the switch to send a switch signal. The location sensor is disposed at the case and configured to sense whether the key plate is located at the first location or the second location. The processor is electrically coupled to the switch and the location sensor and performs a first command or a second command in response to the switch signal and according to the sensing result of the location sensor.

A key module of the invention is configured to assemble on an electronic device and includes a key plate, a switch, and a location sensor. A case of the electronic device has a first hole. The key plate is configured to slidably dispose at the inner wall of the case. A portion of the key plate is exposed at the first hole, and the key plate is configured to slide between a first location and a second location. The switch is configured to dispose at the case. The key plate at the first location or the second location is suitable for pressing the switch to enable the switch to send a switch signal. The location sensor is configured to dispose at the case and configured to sense whether the key plate is located at the first location or the second location. A processor of the electronic device is electrically coupled to the switch and the location sensor and performs a first command or a second command in response to the switch signal and according to the sensing result of the location sensor.

Based on the above, in the electronic device and the key module of the invention, only a single switch signal is able to make the processor perform two types of commands, so as to achieve the multifunction target.

In order to make the aforementioned and other features and advantages of the invention more comprehensible, embodiments accompanying figures are described in detail below.

DESCRIPTION OF THE EMBODIMENTS

Figure 1:
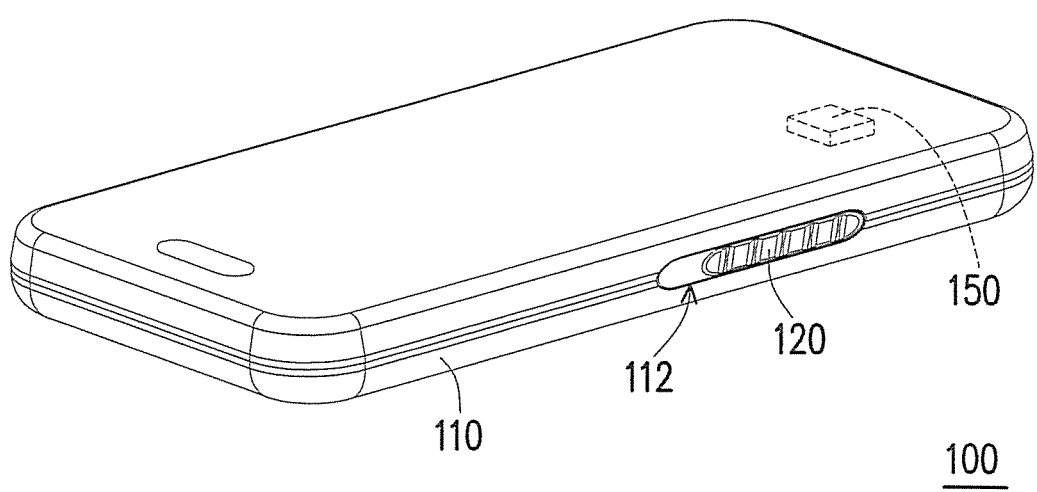
FIG. 1 is a schematic view of the appearance of an electronic device according to one embodiment of the invention.
Figure 2A:
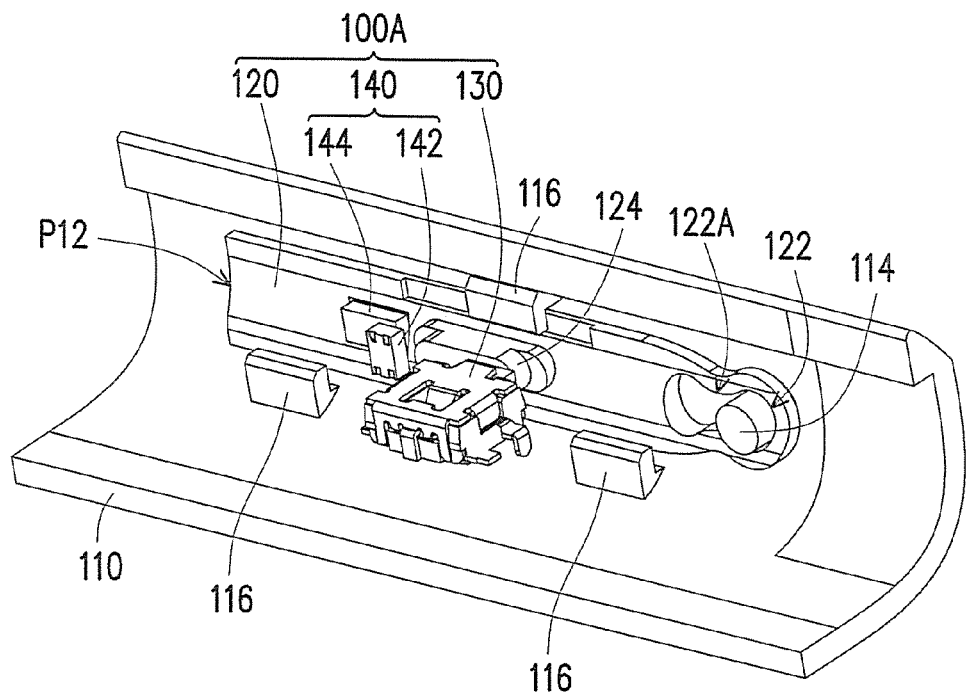
FIG. 2A is a schematic view of the interior at a key module of the electronic device in FIG. 1.

FIG. 1 is a schematic view of the appearance of an electronic device according to one embodiment of the invention. FIG. 2A is a schematic view of the interior at a key module of the electronic device in FIG. 1. Referring to FIG. 1 and FIG. 2A, in the present embodiment, an electronic device 100 includes a case 110, a key plate 120, a switch 130, a location sensor 140, and a processor 150. The case 110 has a first hole 112. The key plate 120 is slidably disposed at the inner wall of the case 110. A portion of the key plate 120 is exposed at the first hole 112. In other words, the key plate 120 may be slidably disposed in the electronic device 100, and at least a portion of the key plate 120 may be seen from outside of the electronic device 100 through the first hole 112. The key plate 120 of the present embodiment has a portion accommodated inside the first hole 112, but the invention is not limited thereto. The key plate 120 is configured to slide between a first location P12 shown in FIG. 2A and a second location P14 shown in FIG. 2B. The switch 130 is disposed in the case 110. The key plate 120 at the first location P12 shown in FIG. 2A or the second location P14 shown in FIG. 2B is suitable for pressing the switch 130 to enable the switch 130 to send a switch signal.

Figure 2B:
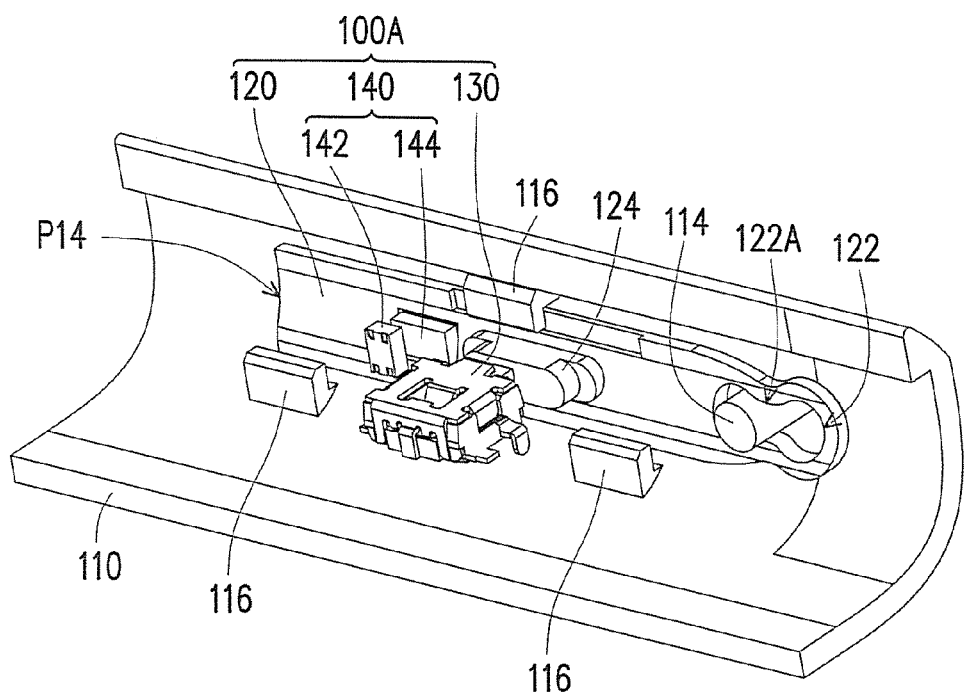
FIG. 2B is a schematic view of a key plate of the key module in FIG. 2A after the key plate is slided to another location.

The location sensor 140 is disposed at the case 110 and configured to sense whether the key plate 120 is located at the first location P12 shown in FIG. 2A or the second location P14 shown in FIG. 2B. The processor 150 is electrically coupled to the switch 130 and the location sensor 140 and performs a first command or a second command in response to the switch signal and according to the sensing result of the location sensor 140. In the drawings, the electrical coupling relationship between the processor 150, the switch 130, and the location sensor 140 is not shown. In addition, the processor 150 being electrically coupled to the switch 130 and the location sensor 140 only represents that the switch signal provided by the switch 130 may be transmitted to the processor 150 in electrical form, the sensing result provided by the location sensor 140 may be transmitted to the processor 150 in electrical form, and any type of electrical signal transmitting is acceptable, the invention is not limited thereto. Generally, the relative location between the case 110 and the switch 130 is unchanged, and the key plate 120 is able to move relatively to the case 110. In addition, the key plate 120, the switch 130, and the location sensor 140 constitute a key module 100A in one embodiment of the invention.

As described above, when the key plate 120 is located at the first location P12 shown in FIG. 2A, the key plate 120 presses the switch 130 to enable the switch 130 to send the switch signal. Simultaneously, the location sensor 140 senses that the key plate 120 is located at the first location P12. Therefore, the processor 150 performs the first command in response to the switch signal, such as making the electronic device 100 enter the camera mode. On the other hand, when the key plate 120 is located at the second location P14 shown in FIG. 2B, the key plate 120 also presses the switch 130 to enable the switch 130 to send the switch signal. Simultaneously, the location sensor 140 senses that the key plate 120 is located at the second location P14. Therefore, the processor 150 performs the second command in response to the switch signal, such as making the electronic device 100 enter the dialing mode. As a result, the user can input two operational commands through only a single key plate 120. Moreover, the user is more likely to accept a key providing press feelings. In addition, since the location sensor 140 may sense the change of the location of key plate 120, the movement of the key plate 120 may also be used as an input command, and the differences in direction of movement may also be distinguished and used as two input commands. Based on the above, more than two operational commands may be provided by only a single key plate 120 in the invention.

The electronic device 100 in the present embodiment is a smartphone, but the electronic device in the invention may be a tablet computer or other electronic devices. In addition, the location sensor 140 in the present embodiment includes a magnetic sensor 142 and a magnet 144, the magnetic sensor 142 is disposed at the case 110, the magnet 144 is disposed at the key plate 120, and the magnetic sensor 142 is configured to sense the location of the magnet 144. Because the relative location between the magnet 144 and the key plate 120 is unchanged, the magnetic sensor 142 senses the location of the magnet 144 so as to determine whether the key plate 120 is located at the first location P12 shown in FIG. 2A or the second location P14 shown in FIG. 2B. The magnetic sensor 142 may be a giant magnetoresistance (GMR) sensor or other types of the magnetic sensors.

The key plate 120 of the present embodiment has a second hole 122, the case 110 has a positioning column 114. The positioning column 114 passes through the second hole 122 and is positionally limited in the second hole 122, thereby positionally limiting the key plate 120 between the first location P12 shown FIG. 2A and the second location P14 shown in FIG. 2B. The width of a middle section 122A of the second hole 122 of the present embodiment is smaller than the width of the positioning column 114. Therefore, if no force is applied on the key plate 120 to make the key plate 120 deform, the positioning column 114 will be constrained at one of the two ends of the second hole 122, such that the key plate 120 will be constrained at the first location P12 shown in FIG. 2A or the second location P14 shown in FIG. 2B. When the user wants to change the location of the key plate 120, the user needs to apply an appropriate force to push the key plate 120 to make the key plate 120 deform, this time, the positioning column 114 is able to pass through the middle section 122A of the second hole 122. In addition, the case 110 has, for example, a plurality of hooks 116. Because of these hooks 116, the key plate 120 is positionally limited to slide in a sliding direction of the key plate 120, so as to prevent the key plate 120 being disengaged from the case 110. Otherwise, the key plate 120 of the present embodiment has a pressing portion 124. When the key plate 120 is located at the first location P12 shown in FIG. 2A or the second location P14 shown in FIG. 2B, the location of the pressing portion 124 is always corresponding to the switch 130. In other words, the protruding pressing portion 124 at both locations may be configured to press the switch 130.

Figure 3:
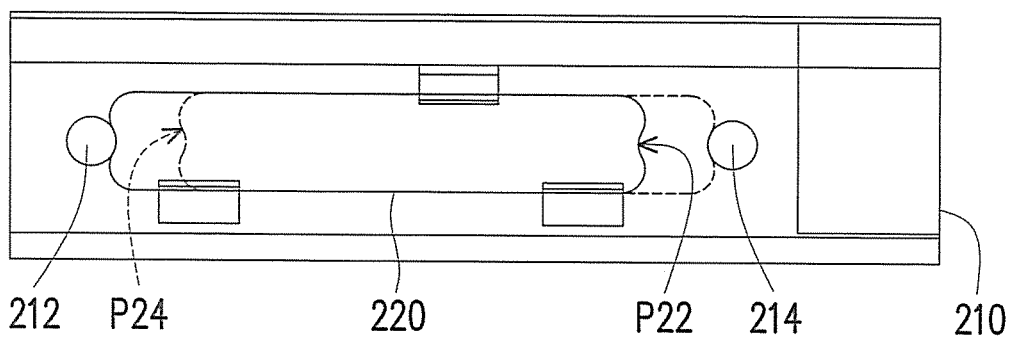
FIG. 3 is a schematic view of a key module according to another embodiment of the invention.

FIG. 3 is a schematic view of a key module according to another embodiment of the invention. Referring to FIG. 3, the key module in the present embodiment is similar to the key module of the previous embodiment, only the differences are described hereinafter. The case 210 of the present embodiment has a first positioning column 212 and a second positioning column 214. The key plate 220 presses against the first positioning column 212 or the second positioning column 214 when the key plate 220 is located at the first location P22 or the second location P24 respectively. In other words, the first positioning column 212 and the second positioning column 214 limit the key plate 220 between the first location P22 and the second location P24.

Based on the above, in the electronic device and the key module of the invention, the processor may perform different commands when the user presses the key plate at different locations. Therefore, a single key plate may be configured to provide two or more input commands, and not only is the space needed to configure the key saved but also multifunction requirement is achieved.

Although the invention has been disclosed with reference to the aforesaid embodiments, they are not intended to limit the invention. It will be apparent to one of ordinary skill in the art that modifications and variations to the described embodiments may be made without departing from the spirit and the scope of the invention. Accordingly, the scope of the invention will be defined by the attached claims and not by the above detailed descriptions.

What is claimed is:

1. An electronic device, comprising:
   a case, having a first hole;
   a key plate, slidably disposed at an inner wall of the case, wherein a portion of the key plate is exposed at the first hole, and the key plate is configured to slide between a first location and a second location;
   a switch, disposed at the case, wherein the key plate at the first location and the second location is suitable for pressing the switch to enable the switch to send a switch signal;
   a location sensor, disposed at the case, configured to sense whether the key plate is located at the first location or the second location; and
   a processor, electrically coupled to the switch and the location sensor, configured to perform a first command or a second command in response to the switch signal and according to a sensing result of the location sensor.

2. The electronic device as recited in claim 1, wherein the location sensor comprises a magnetic sensor and a magnet, the magnetic sensor is disposed at the case, the magnet is disposed at the key plate, and the magnetic sensor is configured to sense a location of the magnet.

3. The electronic device as recited in claim 1, wherein the key plate has a second hole, the case has a positioning column, the positioning column passes through the second hole to limit the key plate between the first location and the second location.

4. The electronic device as recited in claim 3, wherein a width of a middle section of the second hole is smaller than a width of the positioning column, and the positioning column is able to pass through the middle section of the second hole when the key plate is elastically deformed.

5. The electronic device as recited in claim 1, wherein the case has a first positioning column and a second positioning column, and the key plate presses against the first positioning column or the second positioning column when the key plate is located at the first location or the second location respectively.

6. The electronic device as recited in claim 1, wherein the case has a plurality of hooks configured to limit the key plate to slide in a sliding direction of the key plate.

7. The electronic device as recited in claim 1, wherein the key plate has a pressing portion, a location of the pressing portion is corresponding to the switch when the key plate is located at the first location and the second location.

8. A key module, configured to assemble on an electronic device, comprising:
- a key plate, configured to slidably dispose at an inner wall of a case of the electronic device, wherein a portion of the key plate is exposed at a first hole of the case, and the key plate is configured to slide between a first location and a second location;
- a switch, configured to dispose at the case, wherein the key plate at the first location and the second location is suitable for pressing the switch to enable the switch to send a switch signal;
- a location sensor, configured to dispose at the case, and configured to sense whether the key plate is located at the first location or the second location, wherein a processor of the electronic device is electrically coupled to the switch and the location sensor, and is configured to perform a first command or a second command in response to the switch signal and according to a sensing result of the location sensor.

9. The key module as recited in claim 8, wherein the location sensor comprises a magnetic sensor and a magnet, the magnetic sensor is disposed at the case, the magnet is disposed at the key plate, and the magnetic sensor is configured to sense a location of the magnet.

10. The key module as recited in claim 8, wherein the key plate has a second hole, the case has a positioning column, the positioning column passes through the second hole to limit the key plate between the first location and the second location.

11. The key module as recited in claim 10, wherein a width of a middle section of the second hole is smaller than a width of the positioning column, and the positioning column is able to pass through the middle section of the second hole when the key plate is elastically deformed.

12. The key module as recited in claim 8, wherein the case has a first positioning column and a second positioning column, and the key plate presses against the first positioning column and the second positioning column when the key plate is located at the first location and the second location respectively.

13. The key module as recited in claim 8, wherein the case has a plurality of hooks configured to limit the key plate to slide in a sliding direction of the key plate.

14. The key module as recited in claim 8, wherein the key plate has a pressing portion, a location of the pressing portion is corresponding to the switch when the key plate is located at the first location and the second location.

\* \* \* \* \*